United States Patent
Morioka et al.

(10) Patent No.: US 10,631,293 B2
(45) Date of Patent: *Apr. 21, 2020

(54) COMMUNICATION APPARATUS, COMMUNICATION METHOD, AND COMMUNICATION SYSTEM

(71) Applicant: SONY CORPORATION, Tokyo (JP)

(72) Inventors: Yuichi Morioka, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,547

(22) Filed: Apr. 17, 2019

(65) Prior Publication Data

US 2019/0246396 A1 Aug. 8, 2019

Related U.S. Application Data

(63) Continuation of application No. 15/894,496, filed on Feb. 12, 2018, now Pat. No. 10,306,631, which is a continuation of application No. 15/414,004, filed on Jan. 24, 2017, now Pat. No. 9,930,662, which is a continuation of application No. 14/996,019, filed on Jan. 14, 2016, now Pat. No. 9,585,151, which is a continuation of application No. 13/318,368, filed as application No. PCT/JP2010/054580 on Mar. 17, 2010, now Pat. No. 9,264,119.

(30) Foreign Application Priority Data

May 8, 2009 (JP) ................................. 2009-113871

(51) Int. Cl.
*H04W 72/04* (2009.01)
*H04B 7/06* (2006.01)
(Continued)

(52) U.S. Cl.
CPC ........ *H04W 72/0446* (2013.01); *H04B 7/028* (2013.01); *H04B 7/0452* (2013.01);
(Continued)

(58) Field of Classification Search
None
See application file for complete search history.

(56) References Cited

U.S. PATENT DOCUMENTS

| 6,721,302 B1 | 4/2004 | Alastalo |
| 9,264,119 B2 | 2/2016 | Morioka et al. |

(Continued)

FOREIGN PATENT DOCUMENTS

| CN | 1797987 A | 7/2006 |
| CN | 1898910 A | 1/2007 |

(Continued)

OTHER PUBLICATIONS

Notice of Allowance and Fees Due for U.S. Appl. No. 15/894,496, dated Feb. 8, 2019, 07 pages.

(Continued)

*Primary Examiner* — Brian S Roberts
(74) *Attorney, Agent, or Firm* — Chip Law Group

(57) ABSTRACT

Communication operations are optimally conducted by applying space-division multiple access in which wireless resources on a spatial axis are shared among a plurality of users. By applying an RD protocol to a communication system that conducts space-division multiple access, spatially multiplexed frames in a TXOP are made more efficient. By specifying a frame length for reverse direction frames with reverse direction permission information and having respective transmitters of reverse direction frames make their frame lengths uniform while respecting the specification, AGC operation stabilizes. Also, a transmit start time for reverse direction frames can be specified by reverse direction permission information, and respective transmitters of reverse direction frames can transmit frames at the same time while respecting the specification.

14 Claims, 8 Drawing Sheets

(51) Int. Cl.
  *H04B 7/02* (2018.01)
  *H04B 7/0452* (2017.01)
  *H04W 84/12* (2009.01)
(52) U.S. Cl.
  CPC ........ *H04B 7/0617* (2013.01); *H04W 72/046* (2013.01); *H04W 84/12* (2013.01)

(56) References Cited

U.S. PATENT DOCUMENTS

| | | | |
|---|---|---|---|
| 9,585,151 | B2 | 2/2017 | Morioka et al. |
| 9,930,662 | B2 | 3/2018 | Morioka et al. |
| 10,306,631 | B2 * | 5/2019 | Morioka .............. H04B 7/0617 |
| 2003/0169769 | A1 * | 9/2003 | Ho ........................ H04L 1/1621 370/473 |
| 2004/0082356 | A1 | 4/2004 | Walton et al. |
| 2004/0218695 | A1 | 11/2004 | Koga et al. |
| 2005/0138199 | A1 | 6/2005 | Li et al. |
| 2006/0045059 | A1 | 3/2006 | Yun et al. |
| 2006/0153227 | A1 | 7/2006 | Hwang et al. |
| 2006/0193274 | A1 | 8/2006 | Yamagata |
| 2007/0223608 | A1 | 9/2007 | Nakayama et al. |
| 2007/0230373 | A1 | 10/2007 | Li et al. |
| 2007/0258540 | A1 | 11/2007 | Ratasuk et al. |
| 2009/0207765 | A1 | 8/2009 | Yamaura |
| 2009/0252110 | A1 | 10/2009 | Sridhara et al. |
| 2010/0176929 | A1 | 7/2010 | Ozdemir et al. |
| 2010/0248635 | A1 | 9/2010 | Zhang et al. |
| 2010/0260138 | A1 | 10/2010 | Liu et al. |
| 2010/0260159 | A1 | 10/2010 | Zhang et al. |
| 2010/0290449 | A1 | 11/2010 | Van Nee et al. |
| 2011/0038332 | A1 | 2/2011 | Liu et al. |
| 2011/0235596 | A1 | 9/2011 | Wentink |
| 2012/0039257 | A1 | 2/2012 | Morioka et al. |
| 2012/0099530 | A1 | 4/2012 | Morioka et al. |
| 2012/0099576 | A1 | 4/2012 | Li et al. |
| 2012/0170565 | A1 | 7/2012 | Seok |
| 2014/0376504 | A1 | 12/2014 | Morioka et al. |
| 2015/0139179 | A1 | 5/2015 | Li et al. |
| 2016/0309515 | A1 | 10/2016 | Li et al. |

FOREIGN PATENT DOCUMENTS

| | | |
|---|---|---|
| CN | 102415184 B | 4/2015 |
| CN | 106851851 A | 6/2017 |
| DE | 602004013049 T2 | 6/2009 |
| EP | 1556980 A | 7/2005 |
| EP | 1733510 A1 | 12/2006 |
| JP | 2004-328570 A | 11/2004 |
| JP | 2006-504335 A | 2/2006 |
| JP | 2006-352711 A | 12/2006 |
| KR | 10-2005-0052787 A | 6/2005 |
| KR | 10-0814305 B1 | 3/2008 |
| WO | 2002/041647 A2 | 5/2002 |
| WO | 03/069944 A1 | 8/2003 |
| WO | 2004/038985 A2 | 5/2004 |
| WO | 2004/039011 A2 | 5/2004 |
| WO | 2005/067218 A1 | 7/2005 |
| WO | 2007/114374 A1 | 10/2007 |

OTHER PUBLICATIONS

Notice of Allowance and Fees Due for U.S. Appl. No. 15/894,496, dated Jan. 17, 2019, 10 pages.
Non-Final Rejection for U.S. Appl. No. 15/894,496, dated Aug. 28, 2018, 06 pages.
Summons to Attend Oral Proceedings Rule 115(1) for EP Patent Application No. 10772132.6, dated Oct. 31, 2018, 17 pages of Office Action.
Wang, et al., "IEEE 802.11n MAC Enhancement and Performance Evaluation", Mobile Networks and Applications Archive, vol. 14, Issue 6, Dec. 2009, pp. 760-771.
"Amendment 8: Medium Access Control Quality of Service Enhancements", 2005 IEEE, 88-89 pages.
Office Action for CN Patent Application No. 201510087460.7, dated Sep. 25, 2017, 06 pages of Office Action and 11 pages of English Translation.
Extended European Search Report for European Patent Application No. 10772132.6, dated Jun. 20, 2016, 10 pages.
Worioka et al, "SDMA Operation within 802.11", IEEE 802.11-09/xxxxr0, May 9, 2009, 16 pages.
Office Action for KR Patent Application No. 10-2011-7025949, dated Dec. 3, 2015.
Office Action for CN Patent Application No. 201080019207.3, dated Sep. 4, 2013.
International Search Report and Written Opinion of PCT Application No. PCT/JP2010/054580, dated Jun. 22, 2010, 05 pages of English translation and 05 pages of ISRWO.
Office Action for JP Patent Application No. 2009-113871, dated Dec. 11, 2012.
Notice of Allowance for U.S. Appl. No. 15/414,004, dated Nov. 8, 2017, 10 pages.
Non-Final Rejection for U.S. Appl. No. 15/414,004, dated Jun. 21, 2017, 06 pages.
Notice of Allowance for U.S. Appl. No. 14/996,019, dated Oct. 21, 2016, 10 pages.
Non-Final Rejection for U.S. Appl. No. 14/996,019, dated Jun. 23, 2016, 05 pages.
International Preliminary Report on Patentability of PCT Application No. PCT/JP2010/054580, dated Nov. 17, 2011, 06 pages of English Translation and 04 pages of IPRP.
Notice of Allowance for U.S. Appl. No. 13/318,368, dated Oct. 7, 2015, 05 pages.
Advisory Action for U.S. Appl. No. 13/318,368, dated Aug. 19, 2015, 03 pages.
Final Rejection for U.S. Appl. No. 13/318,368 dated Jun. 8, 2015, 20 pages.
Non-Final Rejection for U.S. Appl. No. 13/318,368, dated Feb. 26, 2015, 17 pages.
Final Rejection for U.S. Appl. No. 13/318,368, dated Oct. 23, 2014, 15 pages.
Non-Final Rejection for U.S. Appl. No. 13/318,368, dated Jun. 3, 2014, 14 pages.
Advisory Action for U.S. Appl. No. 13/318,368, dated Dec. 17, 2013, 03 pages.
Final Rejection for U.S. Appl. No. 13/318,368, dated Aug. 26, 2013, 11 pages.
Non-Final Rejection for U.S. Appl. No. 13/318,368, dated Mar. 26, 2013, 11 pages.
"Part 11: Wireless LAN Medium Access Control (MAC) and Physical Layer (PHY) Specifications Amendment 8: Medium Access Control (MAC) Quality of Service Enhancements", IEEE Computer Society, Jan. 1, 2005, pp. 88-89.
Wang, et al., "IEEE 802.11n MAC Enhancement and Performance Evaluation", Mobile Networks and Applications, vol. 14, Jan. 9, 2009, 14 pages.
Morioka, et al., "SDMA Operation Within 802.11" IEEE 802.11-09/xxxxr0, May 9, 2009, 16 pages.
Extended European Search Report of EP Application No. 19195098.9, dated Dec. 3, 2019, 11 pages.

* cited by examiner

COMMUNICATION APPARATUS, COMMUNICATION METHOD, AND COMMUNICATION SYSTEM

CROSS REFERENCE TO RELATED APPLICATIONS

The present application is a continuation application of U.S. patent application Ser. No. 15/894,496, filed on Feb. 12, 2018, which is a continuation application of U.S. patent application Ser. No. 15/414,004, filed on Jan. 24, 2017, now U.S. Pat. No. 9,930,662, which is a continuation application of U.S. patent application Ser. No. 14/996,019, filed on Jan. 14, 2016, now U.S. Pat. No. 9,585,151, which is a continuation application of U.S. patent application Ser. No. 13/318,368, filed on Dec. 21, 2011, now U.S. Pat. No. 9,264,119, which is a National Stage Entry of Patent Application No. PCT/JP2010/054580 filed on Mar. 17, 2010, which Claims priority from prior Japanese Patent Application JP 2009-113871 filed in the Japan Patent Office on May 8, 2009, the entire contents of which are hereby incorporated by reference.

TECHNICAL FIELD

The present invention relates to a communication apparatus and method, a computer program, and a communication system whereby throughput is improved for an entire plurality of users by applying space-division multiple access (SDMA) in which wireless resources on a spatial axis are shared among a plurality of users. More particularly, the present invention relates to a communication apparatus and method, a computer program, and a communication system whereby an RD (Reverse Direction) protocol is adopted and spatially multiplexed frames in an exclusive channel usage period (TXOP) are made more efficient.

BACKGROUND ART

Wireless communication eliminates the burden of wiring work for wired communication of the past, and is additionally catered for usage as a technology that realizes mobile communication. For example, IEEE (The Institute of Electrical and Electronics Engineers) 802.11 may be cited as an established standard regarding wireless LANs (Local Area Networks). IEEE 802.11a/g is already widely prevalent.

With many wireless LAN systems such as IEEE 802.11, an access control protocol based on carrier sense such as CSMA/CA (Carrier Sense Multiple Access with Collision Avoidance) is implemented, with each station being configured to avoid carrier collisions during random channel access. In other words, a station that has produced a transmission request first monitors the medium state for a given frame interval DIFS (Distributed Inter Frame Space), and if no transmitted signal exists during this space, the station conducts a random backoff. In the case where no transmission signal exists in this space as well, the station obtains an exclusive channel usage transmission opportunity (TXOP), and is able to transmit a frame. Also, "virtual carrier sensing" may be cited as a methodology for resolving the hidden terminal problem in wireless communication. More specifically, in the case where duration information for reserving the medium is stated in a received frame not addressed to the receiving station, that station predicts that the medium will be in use for a period corresponding to the duration information, or in other words virtually senses the carrier, and sets a transmission pause period (NAV: Network Allocation Vector). In so doing, channel exclusivity during a TXOP is assured.

Meanwhile, with the IEEE 802.11a/g standard, orthogonal frequency-division multiplexing (OFDM) is used in the 2.4 GHZ band or the 5 GHz band to support a modulation method that achieves a maximum communication rate (physical layer data rate) of 54 Mbps. Also, with the standard's amendment IEEE 802.11n, MIMO (Multi-Input Multi-Output) communication methods are adopted to realize even higher bit rates. Herein, MIMO is a communication method that realizes spatially multiplexed streams by providing a plurality of antenna elements at both the transmitter end and the receiver end (as is commonly known). Although high throughput (HT) exceeding 100 Mbps can be achieved with IEEE 802.11n, even greater speeds are being demanded as the information size of transmitted content increases.

For example, by increasing the number of antennas on a MIMO communication device to increase the number of spatially multiplexed streams, throughput for 1-to-1 communication can be improved while maintaining backwards compatibility. However, improvements in per-user throughput for communication as well as in throughput for multiple users overall are being demanded for the future.

The IEEE 802.11ac Working Group is attempting to formulate a wireless LAN standard whose data transfer rate exceeds 1 Gbps by using the frequency band below 6 GHz. For its realization, space-division multiple access methods whereby wireless resources on a spatial axis are shared by a plurality of users, such as multi-user MIMO (MU-MIMO) or SDMA (Space-Division Multiple Access), are effective.

For example, there has been proposed a communication system that combines the two technologies of carrier sensing in the legacy IEEE 802.11 standard and space-division multiple access with an adaptive array antenna by using RTS, CTS, and ACK frames in a frame format that maintains backwards compatibility with the legacy 802.11 standard (see PTL 1, for example).

Also, with IEEE 802.11n, an RD (Reverse Direction) protocol is adopted in order to make data transmission in an exclusive channel usage period (TXOP) more efficient. With an ordinary TXOP, only one-way data transfer is conducted wherein the station that has obtained an exclusive channel usage right transmits a data frame. In contrast, with the RD protocol, two roles called the RD initiator and the RD responder are defined. As a result of the RD initiator indicating an RDG (RD Grant), or in other words permitting or granting reverse data transfer, in a specific field in a MAC (Media Access Control) frame sent by the RD initiator (downlink), the RD responder is subsequently able to transmit a data frame in the reverse direction (uplink) addressed to the RD initiator in the same TXOP (see PTL 2, for example).

At this point, a communication system conducting space-division multiple access can improve throughput for multiple users overall (discussed above), but it is thought that spatially multiplexed frames in a TXOP can be more even more efficient by applying the RD protocol defined in IEEE 802.11n.

However, consider a practical configuration wherein an access point takes the role of an RD initiator, and a plurality of terminals take the role of RD responders, for example. In this case, when data frames are sent from the plurality of terminals plurality of terminals to the access point by uplink, the access point will be unable to separate users unless the respective stations multiplex their frames at the same time.

Also, in the case of applying space-division multiple access to a wireless LAN, the case of multiplexing variable-length frames on the same time axis is conceivable. However, if the lengths of the frames sent from respective stations differ, then the received signal power at the access point will vary drastically as the amount of frame multiplexing increases or decreases. This induces unstable operation with respect to automatic gain control (AGC), and there is also a possibility of problems occurring from various perspectives, such as the power distribution in a frame becoming no longer constant with respect to the RCPI (Received Channel Power Indicator) standardized in IEEE 802.11.

In short, a plurality of RD responders requires frames to be sent to an access point at the same time, and additionally requires it to be configured such that even if a plurality of frames with different lengths are sent from an upper layer, the lengths of the frames ultimately sent from the PHY layer are made to be uniform.

CITATION LIST

Patent Literature

PTL 1: Japanese Unexamined Patent Application Publication No. 2004-328570
PTL 2: Japanese Unexamined Patent Application Publication No. 2006-352711, paragraphs 0006 to 0007

DISCLOSURE OF INVENTION

Technical Problem

An object of the present invention is to provide a superior communication apparatus and method, a computer program, and a communication system able to optimally communicate by applying space-division multiple access in which wireless resources on a spatial axis are shared among a plurality of users.

A further object of the present invention is to provide a superior communication apparatus and method, a computer program, and a communication system able to make spatially multiplexed frames in a TXOP more efficient by adopting an RD protocol.

A further object of the present invention is to provide a superior communication apparatus and method, a computer program, and a communication system able to realize space-division multiple access wherein a plurality of RD responders make their frame lengths equal to each other and transmit them to an RD initiator at the same time.

Solution to Problem

Being devised in light of the foregoing problems, the invention described in Claim 1 of this application is a communication apparatus, comprising:
a data processor that processes transmit/receive frames; and
a communication unit that transmits and receives frames; wherein
the data processor adds reverse direction permission information, which indicates that reverse direction frame transmission is permitted, to individual frames in a plurality of frames to be sent at the same time, and
the communication unit multiplexes and transmits the plurality of frames at the same time, and also receives respective frames obeying the reverse direction permission information from respective communication apparatus that received the plurality of frames.

According to the invention described in Claim 2 of this application, it is configured such that the communication unit of a communication apparatus according to Claim 1 is provided with a plurality of antenna elements able to function as an adaptive array antenna with weights applied, wherein the communication unit multiplexes and transmits the plurality of frames at the same time, and also receives a plurality of frames sent at the same time from other communication apparatus.

According to the invention described in Claim 3 of this application, it is configured such that the data processor of a communication apparatus according to Claim 1 specifies, with the reverse direction permission information, a frame length for frames sent in the reverse direction.

According to the invention described in Claim 4 of this application, it is configured such that the data processor of a communication apparatus according to Claim 1 specifies, with the reverse direction permission information, a transmit start time for frames sent in the reverse direction.

The invention described in Claim 5 of this application is a communication apparatus, comprising:
a data processor that processes transmit/receive frames; and
a communication unit that transmits and receives frames; wherein
in response to receiving a frame with reverse direction additional information added thereto, the data processor generates a reverse direction frame having a frame length specified by the reverse direction additional information, and the communication unit transmits the reverse direction frame at a given timing.

Also, the invention described in Claim 6 of this application is a communication apparatus, comprising:
a data processor that processes transmit/receive frames; and
a communication unit that transmits and receives frames; wherein
in response to receiving a frame with reverse direction additional information added thereto, the data processor generates a reverse direction frame, and the communication unit transmits the reverse direction frame at a transmit start time specified by the reverse direction additional information.

Also, the invention described in Claim 7 of this application is a communication method including:
a step that generates a plurality of frames with reverse direction permission information,
which indicates that reverse direction frame transmission is permitted, added thereto;
a step that transmits the plurality of frames at the same time; and
a step that receives respective frames obeying the reverse direction permission information from respective communication apparatus that received the plurality of frames.

Also, the invention described in Claim 8 of this application is a computer program stated in computer-readable format such that a communication apparatus executes processing for transmitting frames on a computer, the program causing the computer to function as a data processor that processes transmit/receive frames, and
a communication unit that transmits and receives frames, wherein
the data processor adds reverse direction permission information, which indicates that reverse direction frame transmission is permitted, to individual frames in a plurality of frames to be sent at the same time, and the communication unit multiplexes and transmits the plurality of frames at the same time, and also receives respective frames obeying the reverse direction permission information from respective communication apparatus that received the plurality of frames.

A computer program in accordance with Claim 8 of this application is defined to be a computer program stated in a computer-readable format such that given processing is executed on a computer. In other words, by installing a computer program in accordance with Claim 8 of this application onto a computer, cooperative action is exhibited on the computer, and operational advantages similar to those of a communication apparatus in accordance with Claim 1 of this application can be obtained.

Also, the invention described in Claim 9 of this application is a communication system, comprising:

a first communication apparatus that transmits a plurality of frames at the same time, the plurality of frames having reverse direction permission information, which indicates that reverse direction frame transmission is permitted, added thereto; and a plurality of second communication apparatus that each receives the frame addressed to itself from among the plurality of frames, and transmits a reverse direction frame, addressed to the first station, that obeys the specifications of the reverse direction permission information.

However, the "system" discussed herein refers to the logical assembly of a plurality of apparatus (or function modules realizing specific functions), and it is not particularly specified whether or not respective apparatus or function modules exist within a single housing.

Advantageous Effects of Invention

According to the present invention, it is possible to provide a superior communication apparatus and method, a computer program, and a communication system able to optimally communicate by applying space-division multiple access in which wireless resources on a spatial axis are shared among a plurality of users.

According to the inventions described in Claims 1, 2, and 7 to 9 of this application, the RD protocol defined in IEEE 802.11n is applied to a communication system that conducts space-division multiple access. In so doing, after an access point has sent spatially multiplexed frames addressed to a plurality of terminals in an acquired TXOP, frame transmission can be subsequently conducted in the reverse direction from respective terminals, and thus spatially multiplexed frames in a TXOP can be made more efficient.

In the case where the reverse direction frames to be sent obeying reverse direction permission information are not the same length, there is a problem in that unstable operation with respect to AGC will occur at the end that receives the plurality of reverse direction frames as the amount of multiplexing in the frames being received increases or decreases. In contrast, according to the inventions described in Claims 3 and 5 of this application, since a frame length for frames sent in the reverse direction is specified by reverse direction permission information, respective transmitters of reverse direction frames make their frame lengths uniform while respecting the specification. In so doing, destabilization of AGC operation can be avoided.

Also, in the case where the frame lengths are not the same for a plurality of frames with reverse direction permission information added thereto, the timings at which transmission of reverse direction frames is started after the respective frame recipient stations finish receiving a frame become different, and the plurality of reverse direction frames stop being multiplexed at the same time. In contrast, according to the inventions described in Claims 4 and 6 of this application, since a transmit start time is specified for reversed direction frames by reverse direction permission information, respective transmitters of reverse direction frames transmit frames at the same time while respecting the specification. In so doing, the plurality of reverse direction frames can be optimally multiplexed.

Further objects, features, and advantages of the present invention will become apparent from the following detailed description based on embodiments of the present invention and the attached drawings.

DESCRIPTION OF EMBODIMENTS

Hereinafter, embodiments of the present invention will be described in detail and with reference to the drawings.

Figure 1:
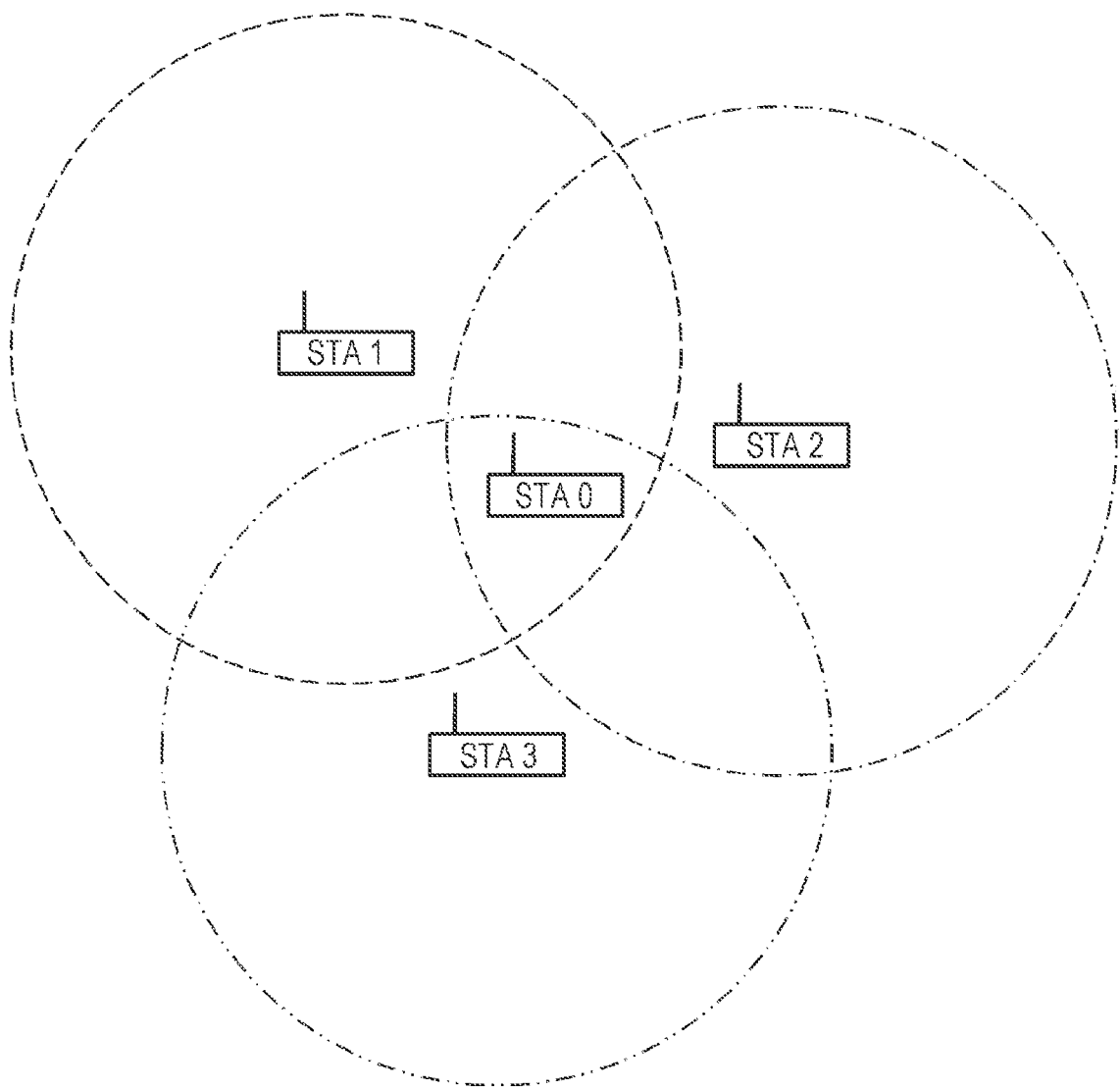
FIG. 1 is a diagram schematically illustrating a configuration of a communication system in accordance with an embodiment of the present invention.

FIG. 1 schematically illustrates a configuration of a communication system in accordance with an embodiment of the present invention. The illustrated communication system is composed of a station STA0 which operates as an access point (AP) and a plurality of stations STA1, STA2, and STA3 which operate as terminals (MTs).

Each of the stations STA1, STA2, and STA3 contain the station STA0 in their respective communication ranges, and each is able to directly communicate with STA0 (in other words, the respective stations STA1, STA2, and STA3 are placed subordinate to STA0 acting as an access point to constitute a BSS (Basic Service Set)). However, the respective stations STA1, STA2, and STA3 acting as terminals are not required to exist within each other's communication ranges, and hereinafter direct communication between terminals will not be discussed.

Herein, STA0 acting as an access point consists of a communication apparatus which is provided with a plurality of antennas and which conducts space-division multiple access with an adaptive array antenna. STA0 allocates wireless resources on a spatial axis to multiple users, and multiplexes frame communication. In other words, STA0 is a communication apparatus that conforms to a new standard such as IEEE 802.11ac, conducting one-to-many frame communication by multiplexing two or more frames addressed to different recipient stations on the same time axis and by separating, by source, frames addressed to STA0 itself which two or more stations have multiplexed on the same time axis and sent. By equipping STA0 with more antennas, it is possible to increase the number of terminals that can be spatially multiplexed. Obviously, STA0 may also individually conduct one-to-one frame communication with the respective stations STA1, STA2, and STA3, rather than just applying space-division multiple access to conduct one-to-many frame communication with the respective stations STA1, STA2, and STA3.

Meanwhile, the stations STA1, STA2, and STA3 acting as terminals consist of communication apparatus which are provided with a plurality of antennas and which conduct space-division multiple access with an adaptive array antenna. However, since STA1, STA2, and STA3 conduct user separation only when receiving and do not conduct user separation when transmitting, or in other words transmit frame multiplexing, they are not required to be equipped with as many antennas as the access point. Furthermore, at least some of the terminals may be communication apparatus which conform to a legacy standard such as IEEE 802.11a. In other words, the communication system illustrated in FIG. 1 is a communication apparatus in which communication devices of the new standard and communication devices of the legacy standard are mixed.

Figure 2:
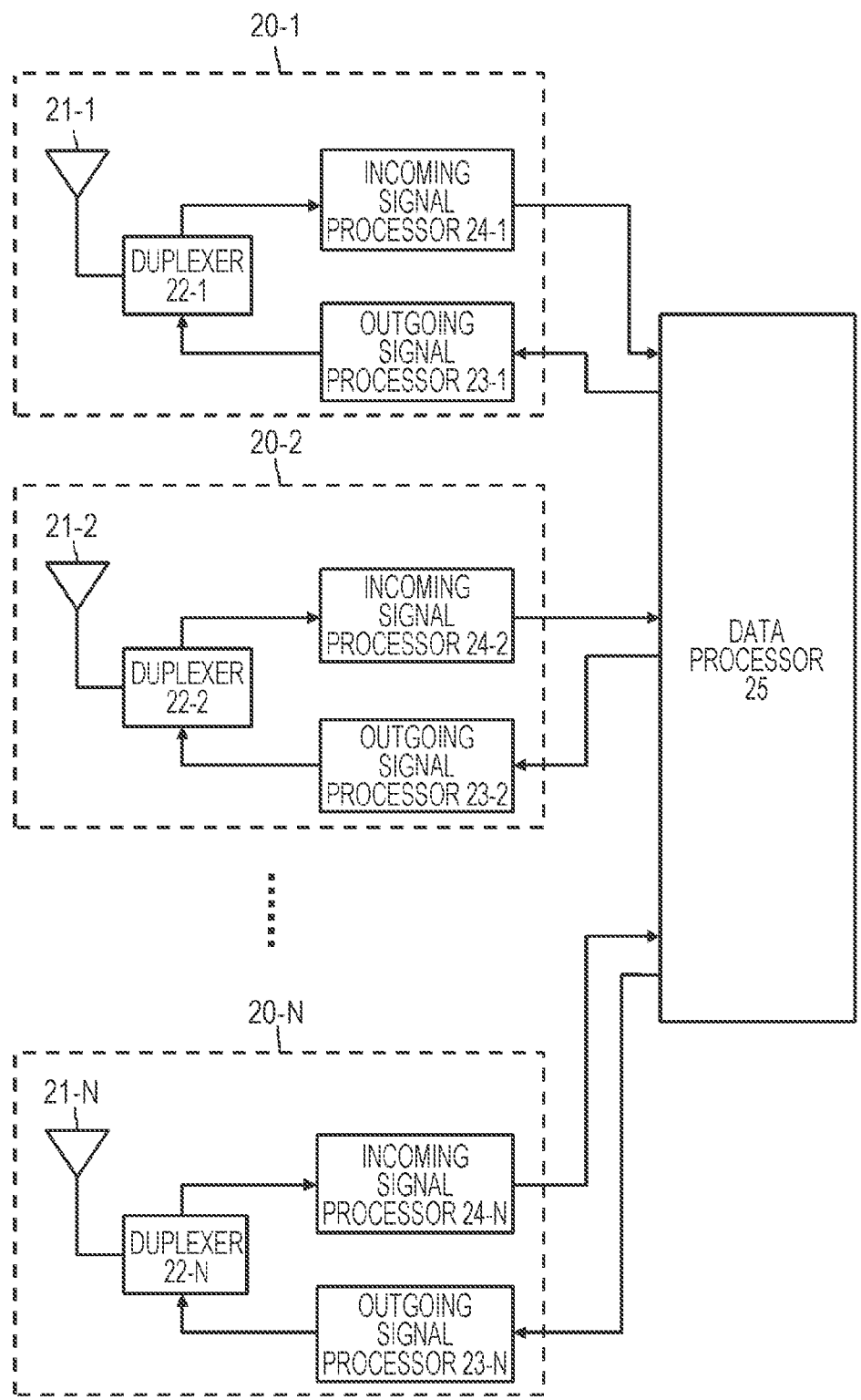
FIG. 2 is a diagram illustrating an exemplary configuration of a communication apparatus able to apply space-division multiple access to conduct multiplexing for multiple users.

FIG. 2 illustrates an exemplary configuration of a communication apparatus able to apply space-division multiple access to conduct multiplexing for multiple users. In the communication system illustrated in FIG. 1, the station STA0 which operates as an access point or the subset of stations compatible with space-division multiple access from among the stations STA1 to STA3 which act as terminals are taken to be provided with the configuration illustrated in FIG. 2 and to communicate according to a new standard.

The illustrated communication apparatus is composed of N transmit/receive signal branches 20-1, 20-2, . . . , 20-N provided with antenna elements 21-1, 21-2, . . . , 21-N, and a data processor 25, connected to each of the transmit/receive signal branches 20-1, 20-2, . . . , 20-N, that processes transmit/receive data (where N is an integer equal to or greater than 2). This plurality of antenna elements 21-1, 21-2, . . . , 21-N is able to function as an adaptive array antenna by applying suitable adaptive array antenna weights to each antenna element. The station STA0 acting as an access point conducts space-division multiple access with an adaptive array antenna, and by having many antenna elements, it is possible to increase the number of terminals that can be accommodated by multiple access.

In the respective transmit/receive signal branches 20-1, 20-2, . . . , 20-N, the respective antenna elements 21-1, 21-2, . . . , 21-N are connected to transmit signal processors 23-1, 23-2, . . . , 23-N and receive signal processors 24-1, 24-2, . . . , 24-N via duplexers 22-1, 22-2, . . . , 22-N.

When transmit data is generated in response to a transmission request from an upper-layer application, the data processor 25 divides it among the respective transmit/receive signal branches 20-1, 20-2, . . . , 20-N. Also, when transmit data addressed to multiple users, or in other words the respective stations STA1, STA2, and STA3, is generated in response to a transmission request from an upper-layer application in the case where the communication apparatus is STA0 which operates as an access point, the data processor 25 spatially separates the data by multiplying it by the transmit adaptive array antenna weights for each transmit/receive signal branch, and then divides the data among the respective transmit/receive signal branches 20-1, 20-2, . . . , 20-N. However, the transmitted "spatial separation" referred to herein is taken to mean only user separation which spatially separates each user transmitting a frame at the same time.

Each of the transmit signal processors 23-1, 23-2, . . . , 23-N performs given signal processing such as coding and modulation on a transmit digital baseband signal supplied from the data processor 25. After that, D/A conversion is performed, and the result is additionally upconverted to an RF (Radio Frequency) signal and power-amplified. Then, these transmit RF signals are supplied to the antenna elements 21-1, 21-2, . . . , 21-N via the duplexers 22-1, 22-2, . . . , 22-N, and broadcast over the air.

Meanwhile, in the respective receive signal processors 24-1, 24-2, . . . , 24-N, when received RF signals are supplied from the antenna elements 21-1, 21-2, . . . , 21-N via the duplexers 22-1, 22-2, . . . , 22-N, the signals are low-noise-amplified and the downconverted to analog baseband signals. After that, D/A conversion is performed, and given signal processing such as decoding and demodulation is additionally performed.

The data processor 25 spatially separates received digital signals input from the respective receive signal processors 24-1, 24-2, . . . , 24-N by multiplying each signal by a receive adaptive array antenna weight. Once the transmit data from each user, or in other words the individual stations STA1, STA2, and STA3, is reconstructed, the data processor 25 passes the data to an upper-layer application. However, the received "spatial separation" referred to herein is taken to include the meaning of both user separation which spatially separates each user transmitting a frame at the same time, and channel separation which separates a spatially multiplexed MIMO channel into the original plurality of streams.

Herein, in order for the plurality of antenna elements 21-1, 21-2, . . . , 21-N to function as an adaptive array antenna, the data processor 25 controls the respective transmit signal processors 23-1, 23-2, . . . , 23-N and the respective receive signal processors 24-1, 24-2, . . . , 24-N such that transmit adaptive array antenna weights are applied to transmit data that has been divided among the respective transmit/receive signal branches 20-1, 20-2, . . . , 20-N, and also such that receive adaptive array antenna weights are applied to received data from the respective transmit/receive signal branches 20-1, 20-2, . . . , 20-N. Also, the data processor 25 learns the adaptive array antenna weights prior to space-division multiple access with the respective stations STA1, STA2, and STA3. For example, adaptive array antenna weights can be learned by using a given adaptive algorithm such as RLS (Recursive Least Square) on a training signal (discussed later) consisting of established sequences received from the respective peers STA1 to STA3.

The data processor 25 executes processes in respective layers of a communication protocol for a media access control (MAC) method implemented by the communication system illustrated in FIG. 1, for example. Also, the respective transmit/receive signal branches 20-1, 20-2, . . . , 20-N execute processing that corresponds to the PHY layer, for example. As discussed later, frames sent from an upper layer are adjusted to have a given length when ultimately sent from the PHY layer. However, such frame length control is not particularly limited to being conducted by the data processor 25 or one of the respective transmit/receive signal branches 20-1, 20-2, . . . , 20-N.

Herein, the stations STA1, STA2, and STA3 acting as terminals are provided with a plurality of antennas and conduct space-division multiple access with an adaptive array antenna. However, since STA1, STA2, and STA3 conduct user separation only when receiving and do not conduct user separation when transmitting, or in other words transmit frame multiplexing, they are not required to be equipped with as many antennas as the access point.

Figure 3:
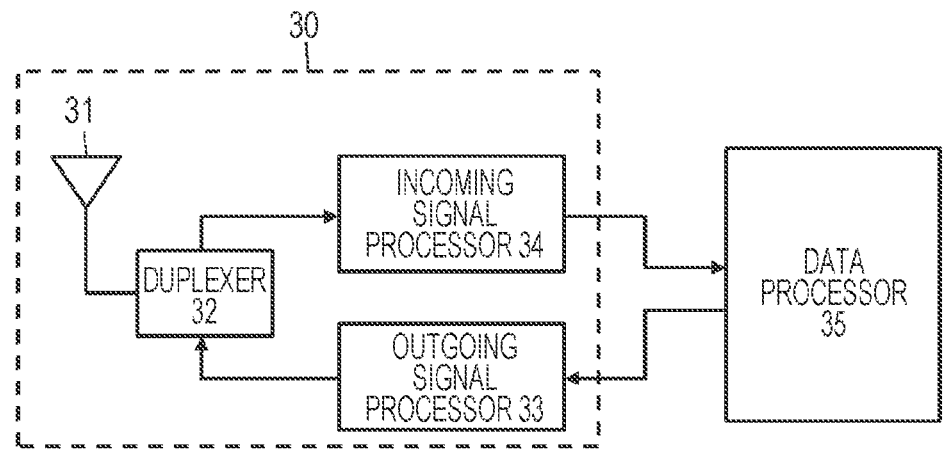
FIG. 3 is a diagram illustrating an exemplary configuration of a communication apparatus conforming to a legacy standard such as IEEE 802.11a without applying space-division multiple access.

Also, FIG. 3 illustrates an exemplary configuration of a communication apparatus conforming to a legacy standard such as IEEE 802.11a without applying space-division multiple access. In the communication system in FIG. 1, there exists a station, among the stations STA1 to STA3 which operate as terminals, that is provided with the configuration illustrated in FIG. 3 and which communicates according to a legacy standard.

The illustrated communication apparatus is composed of a transmit/receive signal branch 30 provided with an antenna element 31, and a data processor 35, connected to this transmit/receive signal branch 30, that processes transmit/receive data. Also, in the transmit/receive signal branch 30, the antenna element 31 is connected to a transmit signal processor 33 and a receive signal processor 34 via a duplexer 32.

The data processor 35 generates transmit data in response to a transmission request from an upper-layer application, and outputs it to the transmit/receive signal branch 30. The transmit signal processor 33 performs given signal processing such as coding and modulation on a transmit digital baseband signal. After that, D/A conversion is performed, and the result is additionally upconverted into an RF signal and power-amplified. Then, this transmit RF signal is supplied to the antenna element 31 via the duplexer 32 and broadcast over the air.

Meanwhile, in the receive signal processor 34, when a received RF signal is supplied from the antenna element 31 via the duplexer 32, the signal is low-noise-amplified and then downconverted to an analog baseband signal. After that, D/A conversion is performed, and given signal processing such as decoding and demodulation is additionally performed. Once the original transmitted data is reconstructed from the received digital signal input from the receive signal processor 34, the data processor 35 passes the data to an upper-layer application.

In the communication system illustrated in FIG. 1, STA0 acting as an access point is able to function as an adaptive array antenna by applying adaptive array antenna weights to the plurality of antenna elements 21-1, 21-2, . . . , 21-N, and is thereby able to create directionality with respect to the respective stations STA1 to STA3. As a result, it is possible to separate wireless resources on a spatial axis for each user and transmit a plurality of multiplexed frames addressed to the respective stations STA1 to STA3 at the same time. Also, by functioning as an adaptive array antenna, STA0 is able to spatially separate and receive respective frames sent at the same time from the respective stations STA1 to STA3.

Herein, in order for the plurality of antenna elements 21-1, 21-2, . . . , 21-N to function as an adaptive array antenna, adaptive array antenna weights must be learned in advance. For example, STA0 may learn adaptive array antenna weights by acquiring a transfer function from training signals consisting of established sequences respectively received from the stations STA1 to STA3. Alternatively, STA0 may learn adaptive array antenna weights directly by using a given adaptive algorithm such as RLS on training signals individually received from a plurality of peers.

Regardless of the learning method, STA0 needs the respective stations STA1 to STA3 to transmit training signals in order to learn adaptive array antenna weights. Also, in a communication environment where communication apparatus that only follow a legacy standard also exist, training signals must be transmitted while avoiding interference due to the communication apparatus that only follow the legacy standard, similarly to how ordinary frame exchange sequences must be carried out while avoiding carrier collisions. In other words, STA0 need to learn adaptive array antenna weights while preserving backwards compatibility with the legacy standard.

Figure 4:
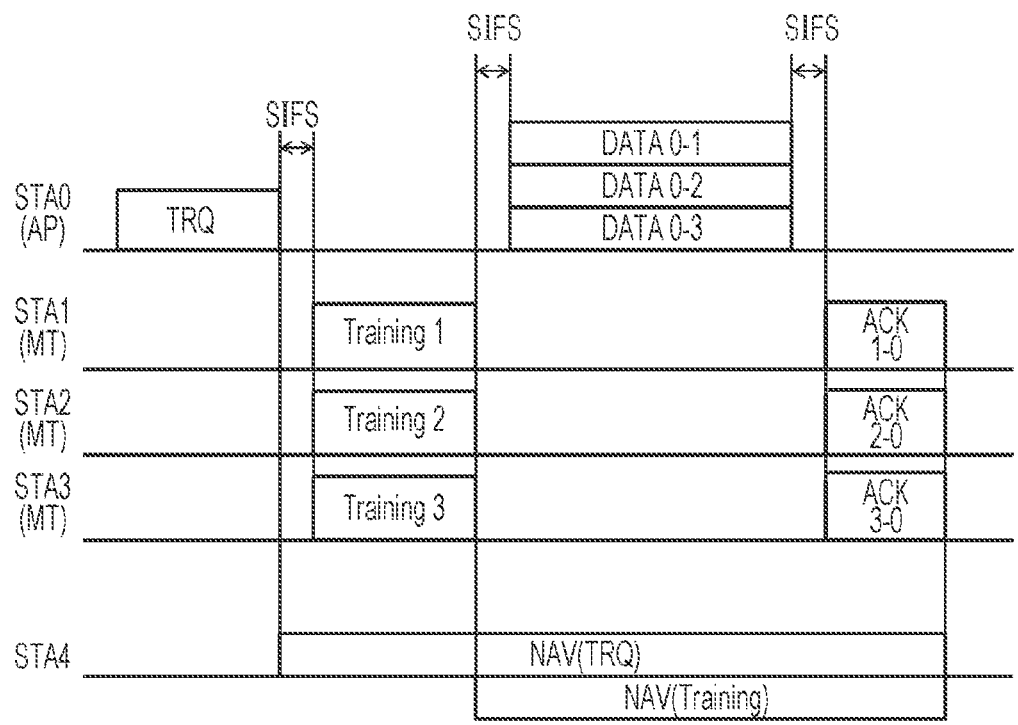
FIG. 4 is a diagram illustrating an exemplary communication sequence for the case where, given the communication system illustrated in FIG. 1 with a station STA0 which operates as an access point being the data source and respective stations STA1 to STA3 which operate as terminals being data recipients, STA0 simultaneously transmits transmit frames addressed to the respective stations STA1 to STA3 multiplexed on a spatial axis.

FIG. 4 illustrates an exemplary communication sequence for learning adaptive array antenna weights on the basis of training signals. In the illustrated example, it is configured such that the station to conduct learning transmits a training request (TRQ) frame requesting transmission of a training signal, and respective nearby stations that receive the TRQ frame respectively reply with a training frame containing an established sequence used for learning. Herein, the station STA4 in FIG. 4, although not included in FIG. 1, is a station that conforms to a legacy standard, and is taken to be a hidden terminal existing within the communication range of at least one of the stations STA0 to STA3.

STA0 acting as an access point conducts physical carrier sensing in advance to confirm that the medium is clear, and after additionally conducting a backoff, is able to acquire a period TXOP during which STA0 can use the channel exclusively. The access point uses this TXOP to transmit a TRQ frame. Since adaptive array antenna weights have not been learned at this point (in other words, the plurality of antenna elements 21-1, 21-2, . . . , 21-N are not functioning are an adaptive array antenna), the TRQ frame is sent nondirectionally.

The TRQ frame includes fields in accordance with the legacy standard IEEE 802.11, and is taken to state duration information, which requests that stations to which the TRQ is not addressed (hidden terminals) set a NAV counter value corresponding to the period until the signal transmission sequence ends (in the illustrated example, until ACK transmission is completed).

In the case where STA4, which conforms to the legacy standard, receives the above TRQ frame which does not include STA4 itself as a recipient, STA4 sets a NAV counter value on the basis of the duration information stated in the frame, and refrains from transmission operations.

In the station arrangement illustrated in FIG. 1, a TRQ frame sent from STA0 will reach the respective stations STA1 to STA3. In response, and after a given frame interval SIFS (Short Inter Frame Space) has elapsed since receiving the TRQ frame stating the addresses of STA1 to STA3 themselves as recipient addresses, the respective stations STA1 to STA3 respectively reply with training frames (Training 1, Training 2, Training 3) containing established sequences which can be used for adaptive array antenna learning.

In the present embodiment, in order to learn adaptive array antenna weights while preserving backwards-compatibility with a legacy standard, a training frame consists of a leading field that obeys the legacy standard IEEE 802.11, and a trailing field that is not backwards-compatible with the legacy standard and which includes an established sequence for training. In the leading field that obeys the legacy standard, spoofing is performed to cause nearby stations conforming to the legacy standard to mistakenly believe that the training frame will continue until the time at which subsequent ACK transmission is completed. This spoofing is performed in order to cause such nearby stations to refrain from transmission operations throughout the period lasting until the signal transmission sequence ends. Meanwhile, for details regarding spoofing technology, refer to Japanese Unexamined Patent Application Publication No. 2008-252867 previously granted to the Applicant, for example.

Also, in the example illustrated in FIG. 4, the respective stations STA1 to STA3 are configured to transmit training frames simultaneously.

At this point, a method that transmits respective training frames by time division is also conceivable. However, if training frames are sent by time division, the period lasting until all training frames are sent (in other words, the transmission standby period for nearby stations) will become longer as the number of stations replying with a training frame (in other words, the number of stations which must be learned) increases, thus leading to decreases in overall system throughput and increases in overhead. Also, a nearby station (hidden terminal) that is only able to receive a training frame sent on the later end of the time axis may have its NAV counter value expire before the training frame arrives. Thus, there is a possibility that the nearby station may initiate transmission operations and carrier collisions may become unavoidable. For these reasons, in the present embodiment, the respective stations STA1 to STA3 transmit training frames simultaneously.

Meanwhile, after completing transmission of a TRQ frame, STA0 stands by to receive training frames respectively sent from the recipients STA1 to STA3 to which the TRQ frame was respectively addressed. At the time of receiving training frames, STA0 has still not conducted adaptive array antenna learning, and thus it is necessary for STA0 to use one of the antenna elements to simultaneously receive a plurality of training frames. At this point, it becomes possible for STA0 to avoid collisions and receive the leading, backwards-compatible field parts of the simultaneously sent training frames in the case where the following three conditions are satisfied.

(1) The OFDM modulation scheme is used.

(2) The oscillators of the respective stations STA1, STA2, and STA3 operate so as to correct the frequency error with the oscillator used by STA0.

(3) The stated contents of the relevant fields in the training frames sent by the respective stations STA1, STA2, and STA3 are all identical.

The OFDM modulation scheme in condition (1) is known to be resilient to multipath fading. Also, condition (2) can be satisfied by having the respective stations STA1, STA2, and STA3 carry out frequency correction when receiving a TRQ frame from STA0. By carrying out frequency correction, the delay times at which the training frames simultaneously sent from the respective stations STA1, STA2, and STA3 arrive at STA0 are guaranteed to fall within the guard interval. Additionally, as cited by condition (3), if the relevant fields in the respective stations STA1, STA2, and STA3 identical stated contents, they can be handled similarly to ordinary multipath, and it becomes possible to simultaneously receive training frames using a single antenna element.

Meanwhile, STA0 uses the plurality of antenna elements 21-1, 21-2, . . . , 21-N to receive the trailing fields of the training frames which are not backwards-compatible with the legacy standard and which contain established sequences for training. By respectively assigning unique code sequences to the respective stations STA1, STA2, and STA3 in advance as the established sequences for training, STA0 is able to spatially separate the individual sequences. However, the established sequences naturally become longer as the number of stations conducting multiple access by space-division increases, due to the need to distinguish them individually.

Then, STA0 uses a given adaptive algorithm such as the RLS algorithm to learn adaptive array antenna weights on the basis of the respective established sequences. Thereafter, the plurality of antenna elements 21-1, 21-2, . . . , 21-N provided in STA0 function as an adaptive array antenna, and it becomes possible for STA0 to conduct space-division multiple access.

Meanwhile, in the case where STA4, which only obeys the legacy standard, receives one of the above training frames which do not include STA4 itself as a recipient, STA4 mistakenly believes due to spoofing (discussed earlier) that the training frame will continue until the time at which transmission of subsequent ACK frames ends, and refrains from transmission operations.

After a given frame interval SIFS has elapsed since completely receiving the training frames from the respective stations STA1, STA2, and STA3, STA0 respectively transmits data frames (DATA 0-1, DATA 0-2, DATA 0-3) individually addressed to the respective stations STA1, STA2, and STA3. By using the adaptive array antenna weights learned above, STA0 is able to apply space-division multiplexing to a plurality of data frames and transmit them simultaneously.

In response, and after a given frame interval SIFS has elapsed since completely receiving the data frames (DATA 0-1, DATA 0-2, DATA 0-3) respectively addressed to STA1 to STA3 themselves, the respective stations STA1, STA2, and STA3 simultaneously reply with ACK frames (ACK 1-0, ACK 2-0, ACK 3-0).

The plurality of antenna elements 21-1, 21-2, . . . , 21-N at STA0 are already functioning as an adaptive array antenna, and are able to spatially separate the plurality of simultaneously received ACK frames (ACK 1-0, ACK 2-0, ACK 3-0) for each user. For example, by respectively stating the addresses of the stations STA1, STA2, and STA3 as the individual transmitter addresses in the respective ACK frames, STA0 is able to identify the source of each received ACK frame. Also, if the established sequences for training are also included in the ACK frames, STA0 is able to make the learned adaptive array antenna weights adaptively comply with environmental changes on the basis of the established sequences included in the received ACK frames.

In the case where STA4, which obeys the legacy standard, receives one of the above data frames not addressed to STA4 itself, STA4 sets a NAV counter value on the basis of information stated in the frame's duration, and refrains from transmission operations. Also, in the case where STA4, which obeys the legacy standard, receives one of the above ACK frames not addressed to STA4 itself, STA4 sets a NAV counter value on the basis of information stated in the frame's duration, and refrains from transmission operations.

As the communication sequence illustrated in FIG. 4 by way of example demonstrates, an STA0 conducting space-division multiple access is able to optimally learn adaptive array antenna weights, and furthermore, after learning weights STA0 is able to improve one-to-many throughput, or in other words overall throughput for multiple users, by sharing wireless resources on a spatial axis among a plurality of users and multiplexing and transmitting a plurality of data frames addressed to multiple users.

Figure 5:
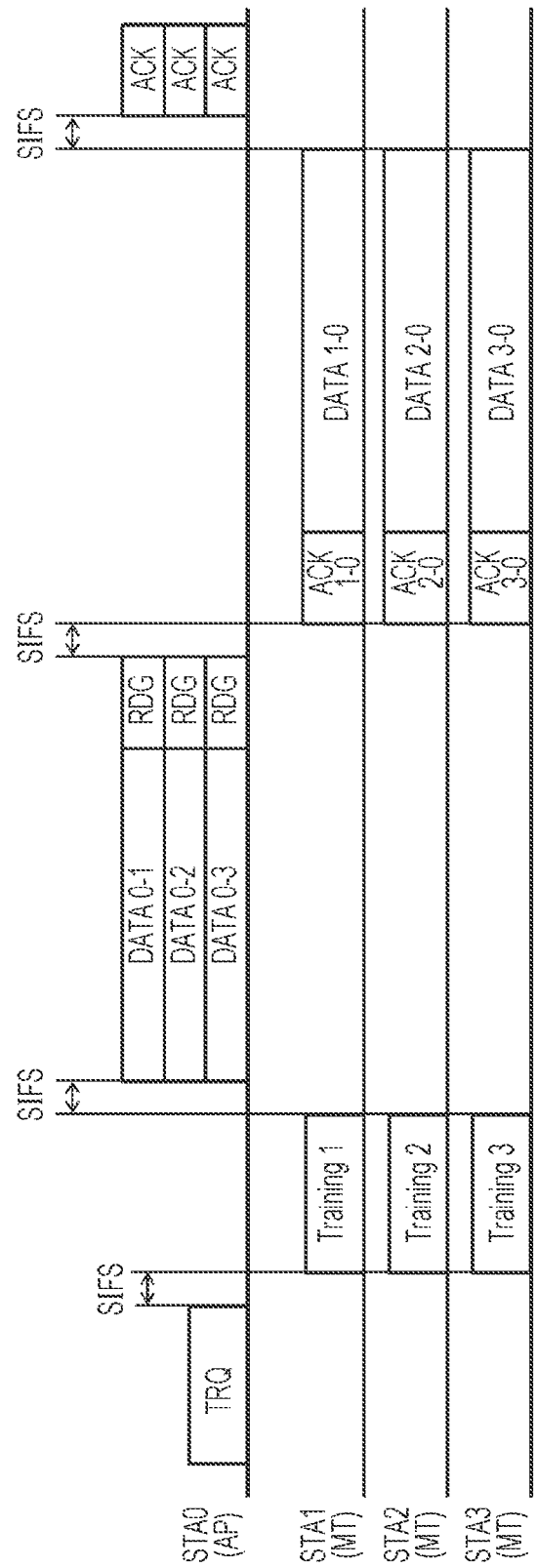
FIG. 5 is a diagram illustrating a modification applying an RD protocol to the exemplary communication sequence illustrated in FIG. 4.

As discussed above, with IEEE 802.11n, an RD protocol is adopted in order to make data transmission in a TXOP more efficient. FIG. 5 illustrates a modification applying an RD protocol to the exemplary communication sequence illustrated in FIG. 4. In this case, uplink and downlink data transfer is conducted in a single TXOP due to data frames being simultaneously sent to an access point from the respective stations STA1 to STA3. However, in FIG. 5, STA0 acting as the access point is taken to be the RD initiator, while the respective terminals STA1 to STA3 are taken to be RD responders.

Upon conducting advance carrier sense and a backoff to acquire a TXOP, STA0 acting as the access point first transmits a TRQ frame.

In response, and after a given frame interval SIFS has elapsed since receiving the TRQ frame stating the addresses of STA1 to STA3 themselves as recipient addresses, the respective stations STA1 to STA3 respectively and simultaneously reply with training frames (Training 1, Training 2, Training 3) containing established sequences which can be used for adaptive array antenna learning.

STA0 uses a given adaptive algorithm such as the RLS algorithm to learn adaptive array antenna weights on the basis of the established sequences included in the respective training frames. Thereafter, the plurality of antenna elements 21-1, 21-2, . . . , 21-N provided in STA0 function as an adaptive array antenna, and it becomes possible for STA0 to conduct space-division multiple access.

Additionally, after a given frame interval SIFS has elapsed since completely receiving the training frames from the respective stations STA1, STA2, and STA3, STA0 respectively transmits downlink frames, or in other words data frames (DATA 0-1, DATA 0-2, DATA 0-3) individually addressed to the respective stations STA1, STA2, and STA3. By using the adaptive array antenna weights learned above, STA0 is able to apply space-division multiplexing to this plurality of data frames and transmit them simultaneously.

Also, STA0 indicates an RDG (RD Grant) for the respective stations STA1, STA2, and STA3 in the MAC frame of each data frame (DATA 0-1, DATA 0-2, DATA 0-3).

Upon recognizing that reverse direction, or in other words uplink, data transfer using the RD protocol has been permitted or granted, the respective stations STA1, STA2, and STA3 simultaneously reply with ACK frames (ACK 1-0, ACK 2-0, ACK 3-0) after a given frame interval SIFS has elapsed since completely receiving the data frames. Furthermore, the respective stations STA1, STA2, and STA3 subsequently and respectively transmit reverse direction data frames (DATA 1-0, DATA 2-0, DATA 3-0) addressed to STA0.

The plurality of antenna elements 21-1, 21-2, . . . , 21-N are already functioning as an adaptive antenna, and thus STA0 is able to spatially separate the plurality of simultaneously received reverse direction data frames (DATA 1-0, DATA 2-0, DATA 3-0) for each user. Then, STA0 simultaneously replies with ACK frames addressed to the respective stations STA1, STA2, and STA3 after a given frame interval SIFS has elapsed since completely receiving the respective data frames.

In the exemplary communication sequence illustrated in FIG. 5, it is drawn such that the reverse direction data frames (DATA 1-0, DATA 2-0, DATA 3-0) simultaneously sent from the respective stations STA1, STA2, and STA3 according to the RD protocol have identical frame lengths. However, in many wireless LAN systems, a variable-length frame format is implemented, and each user's frame lengths are expected to be different when passed from an upper layer. Furthermore, if the frame lengths of the respective data frames ultimately output from the PHY layer of the respective stations STA1, STA2, and STA3 are still different, then unstable operation with respect to AGC will occur at STA0 receiving them as the amount of frame multiplexing increases or decreases while receiving the data frames.

Thus, in the present embodiment, the respective stations STA1, STA2, and STA3 that simultaneously transmit data frames to STA0 by uplink in accordance with the RD protocol are configured to output the individual reverse direction data frames (DATA 1-0, DATA 2-0, DATA 3-0) with uniform frame lengths when ultimately outputting the frames from the PHY layer. For example, the frame lengths can be adjusted at the PHY layer output stage by suitably padding the frames with short frame lengths.

However, the frame "length" referred to herein is taken to include the meaning of time-wise length, number of symbols, number of bits, and data size. Also, frame padding may be conducted taking bits or symbols as minimum units.

Figure 6:
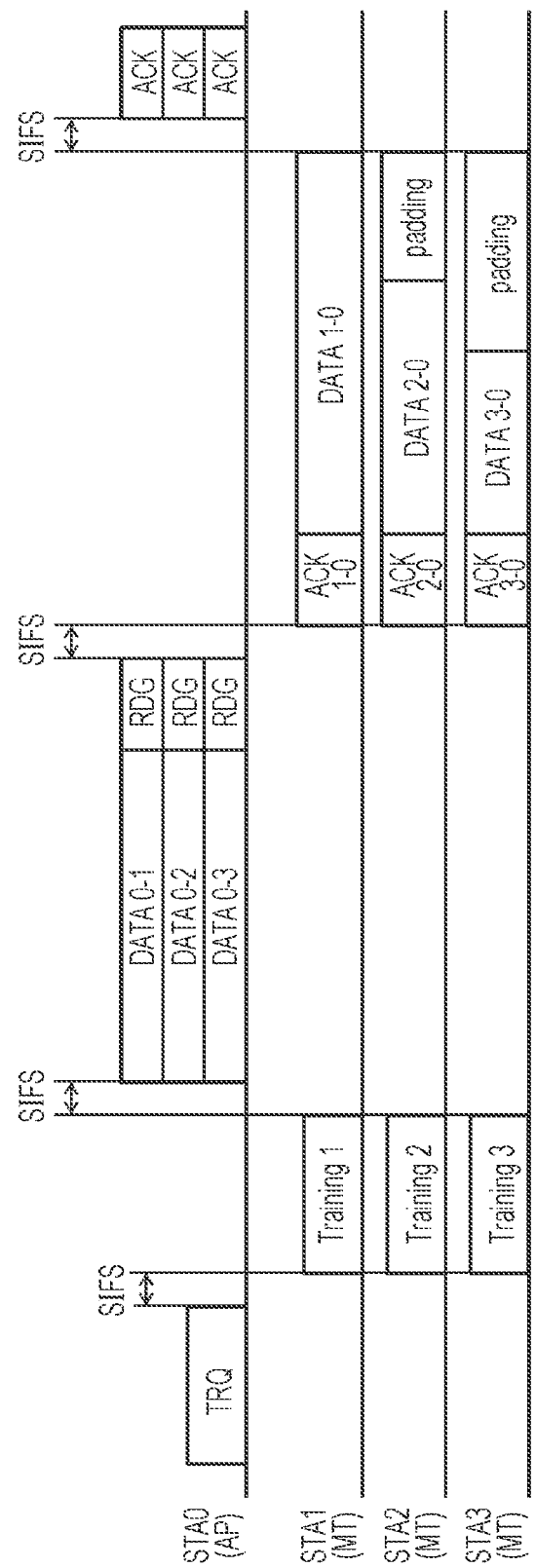
FIG. 6 is a diagram illustrating an exemplary communication sequence for the case of a station STA0 which operates as an access point being the data source and respective stations STA1 to STA3 which operate as terminals being data recipients, wherein an RD protocol is applied and the frame lengths are made the same for frames sent in the reverse direction by the respective stations STA1 to STA3.

FIG. 6 illustrates an exemplary communication sequence for the case of a station STA0 which operates as an access point being the data source and respective stations STA1 to STA3 which operate as terminals being data recipients, wherein an RD protocol is applied and the frame lengths are made the same for data frames sent in the reverse direction by the respective stations STA1 to STA3.

Upon conducting advance carrier sense and a backoff to acquire a TXOP, STA0 acting as the access point first transmits a TRQ frame.

In response, and after a given frame interval SIFS has elapsed since receiving the TRQ frame stating the addresses of STA1 to STA3 themselves as recipient addresses, the respective stations STA1 to STA3 respectively and simultaneously reply with training frames (Training 1, Training 2, Training 3) containing established sequences which can be used for adaptive array antenna learning.

STA0 uses a given adaptive algorithm such as the RLS algorithm to learn adaptive array antenna weights on the basis of the established sequences included in the respective training frames (Training 1, Training 2, Training 3). Thereafter, the plurality of antenna elements 21-1, 21-2, . . . , 21-N provided in STA0 function as an adaptive array antenna, and it becomes possible for STA0 to conduct space-division multiple access.

Additionally, after a given frame interval SIFS has elapsed since completely receiving the training frames from the respective stations STA1, STA2, and STA3, STA0 respectively transmits downlink frames, or in other words data frames (DATA 0-1, DATA 0-2, DATA 0-3) individually addressed to the respective stations STA1, STA2, and STA3. By using the adaptive array antenna weights learned above, STA0 is able to apply space-division multiplexing to the plurality of data frames and transmit them simultaneously.

Also, STA0 indicates an RDG (RD Grant) for the respective stations STA1, STA2, and STA3 in the MAC frame of each data frame (DATA 0-1, DATA 0-2, DATA 0-3).

Upon recognizing that reverse direction, or in other words uplink, data transfer using the RD protocol has been permitted or granted, the respective stations STA1, STA2, and STA3 simultaneously reply with ACK frames (ACK 1-0, ACK 2-0, ACK 3-0) after a given frame interval SIFS has elapsed since completely receiving the data frames. Furthermore, the respective stations STA1, STA2, and STA3 subsequently and respectively transmit reverse direction data frames (DATA 1-0, DATA 2-0, DATA 3-0) addressed to STA0.

At this point, the respective stations STA1, STA2, and STA3 conducts a frame length adjustment process such that the frame length of the data frame ultimately output from each station's own PHY layer is a fixed length.

Herein, one example of a processing method for making respective frame lengths the same is padding the data part of frames which do not satisfy a given length. In the illustrated example, DATA 2-0 and DATA 3-0 are respectively padded, both being shorter than DATA 1-0. The bits or symbols used for padding are preferably established among the communication apparatus exchanging padded frames.

Also, in order for the respective stations STA1, STA2, and STA3 to make the ultimate frame lengths the same for the data frames to be sent by uplink, it is necessary to make the respective stations STA1, STA2, and STA3 recognize a target frame length in advance. A method wherein the access point STA0 reports a common frame length in conjunction with indicating an RDG or a method that defines an uplink frame length with a communication protocol may be cited as examples.

Meanwhile, in the example illustrated in FIG. 6, the padding area is disposed in a block after the data part, but the principal matter of the present invention is not limited to a specific padding method. Although not illustrated, a method that disposes the padding area in a block before the data part, a method that finely divides up the padding area and disposes padding positions distributed throughout the data part, and additionally, a method that disposes padding positions evenly distributed inside the data part, or a method that disposes padding positions unevenly distributed inside the data part may be cited.

The plurality of antenna elements 21-1, 21-2, . . . , 21-N are already functioning as an adaptive antenna, and thus STA0 is able to spatially separate the plurality of simultaneously received reverse direction data frames (DATA 1-0, DATA 2-0, DATA 3-0) for each user. Then, STA0 removes the padded symbols from the separated data frames, and decodes the data. Also, STA0 simultaneously replies with ACK frames addressed to the respective stations STA1, STA2, and STA3 after a given frame interval SIFS has elapsed since completely receiving the respective data frames.

In the exemplary communication sequence illustrated in FIG. 6, it is drawn such that the data frames (DATA 0-1, DATA 0-2, DATA 0-3) individually addressed to the respective stations STA1, STA2, and STA3 from the access point STA0 have identical frame lengths. However, in the case where a variable-length frame format is implemented, this plurality of data frames to be multiplexed at the same time are not limited to having identical frame lengths. In the case where the multiplexed data frames addressed to the respective stations STA1, STA2, and STA3 do not have identical frame lengths, if the respective stations STA1, STA2, and STA3 try to initiate uplink data frame transfer based on the times at which they respectively received the data frames at their own stations, the reverse direction data frames (DATA 1-0, DATA 2-0, DATA 3-0) will not be multiplexed at the same time. As a result, the access point STA0 will become unable to conduct user separation.

Thus, in the present embodiment, the respective stations STA1, STA2, and STA3 that simultaneously transmit data frames to STA0 by uplink in accordance with the RD protocol are configured to transmit their individual reverse direction data frames (DATA 1-0, DATA 2-0, DATA 3-0) at the same time, regardless of the times at which the frames indicating the individual RDGs are received. Also, the individual reverse direction data frames (DATA 1-0, DATA 2-0, DATA 3-0) are taken to have fixed frame lengths.

Herein, the respective stations STA1, STA2, and STA3 must recognize each other's times at which the data frames (DATA 1-0, DATA 2-0, DATA 3-0) are sent by uplink. A method that additionally reports information on frame transmitting times by the respective stations STA1, STA2, and STA3 when the access point STA0 indicates RDGs may be cited, for example.

Figure 7:
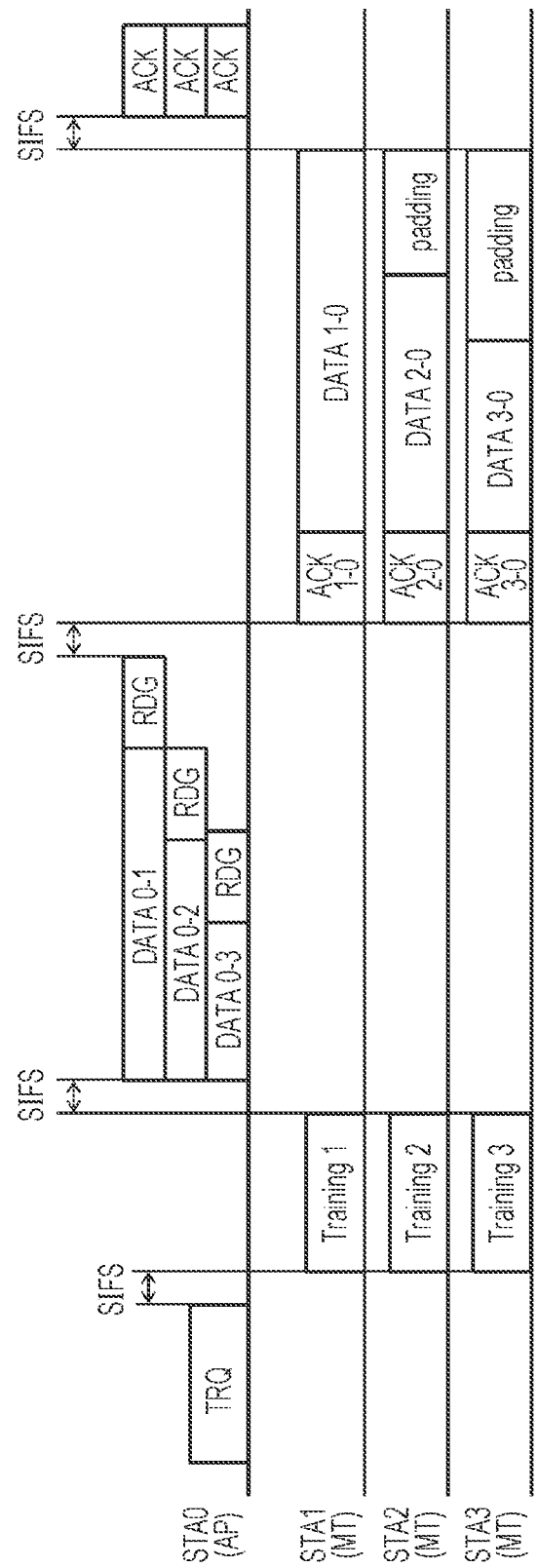
FIG. 7 is a diagram illustrating an exemplary communication sequence for the case of a station STA0 which operates as an access point being the data source and respective stations STA1 to STA3 which operate as terminals being data recipients, wherein an RD protocol is applied and the respective stations STA1 to STA3 transmit reverse direction data frames at the same time.

FIG. 7 illustrates an exemplary communication sequence for the case of a station STA0 which operates as an access point being the data source and respective stations STA1 to STA3 which operate as terminals being data recipients, wherein an RD protocol is applied and the respective stations STA1 to STA3 transmit reverse direction data frames at the same time.

Upon conducting advance carrier sense and a backoff to acquire a TXOP, STA0 acting as the access point first transmits a TRQ frame.

In response, and after a given frame interval SIFS has elapsed since receiving the TRQ frame stating the addresses of STA1 to STA3 themselves as recipient addresses, the respective stations STA1 to STA3 respectively and simultaneously reply with training frames (Training 1, Training 2, Training 3) containing established sequences which can be used for adaptive array antenna learning.

STA0 uses a given adaptive algorithm such as the RLS algorithm to learn adaptive array antenna weights on the basis of the established sequences included in the respective training frames. Thereafter, the plurality of antenna elements 21-1, 21-2, . . . , 21-N provided in STA0 function as an adaptive array antenna, and it becomes possible for STA0 to conduct space-division multiple access.

Additionally, after a given frame interval SIFS has elapsed since completely receiving the training frames from the respective stations STA1, STA2, and STA3, STA0 respectively transmits downlink frames, or in other words data frames (DATA 0-1, DATA 0-2, DATA 0-3) individually addressed to the respective stations STA1, STA2, and STA3. By using the adaptive array antenna weights learned above, STA0 is able to apply space-division multiplexing to this plurality of data frames and transmit them simultaneously.

Also, STA0 indicates an RDG (RD Grant) for the respective stations STA1, STA2, and STA3 in the MAC frame of each data frame (DATA 0-1, DATA 0-2, DATA 0-3). However, the respective data frames that STA0 transmits to the respective stations STA1, STA2, and STA3 have different frame lengths as illustrated, with DATA 2-0 and DATA 3-0 being shorter than DATA 1-0.

Upon recognizing that reverse direction, or in other words uplink, data transfer using the RD protocol has been permitted or granted, the respective stations STA1, STA2, and STA3 conduct a frame length adjustment process such that the data frames ultimately output from the PHY layer of the respective stations have fixed frame lengths. As discussed earlier, the respective data frames that STA0 transmits to the respective stations STA1, STA2, and STA3 have different frame lengths, and the individual reception end times do not match. However, the respective stations STA1, STA2, and STA3 are configured to simultaneously reply with ACK frames (ACK 1-0, ACK 2-0, ACK 3-0) at the same time reported in conjunction with the RDGs. Furthermore, the respective stations STA1, STA2, and STA3 subsequently and respectively transmit reverse direction data frames (DATA 1-0, DATA 2-0, DATA 3-0) addressed to STA0.

The plurality of antenna elements 21-1, 21-2, ..., 21-N are already functioning as an adaptive antenna, and thus STA0 is able to spatially separate the plurality of simultaneously received reverse direction data frames (DATA 1-0, DATA 2-0, DATA 3-0) for each user. Then, STA0 removes the padded symbols from the separated data frames and decodes the data. Also, STA0 simultaneously replies with ACK frames addressed to the respective stations STA1, STA2, and STA3 after a given frame interval SIFS has elapsed since completely receiving the respective data frames.

Figure 8:
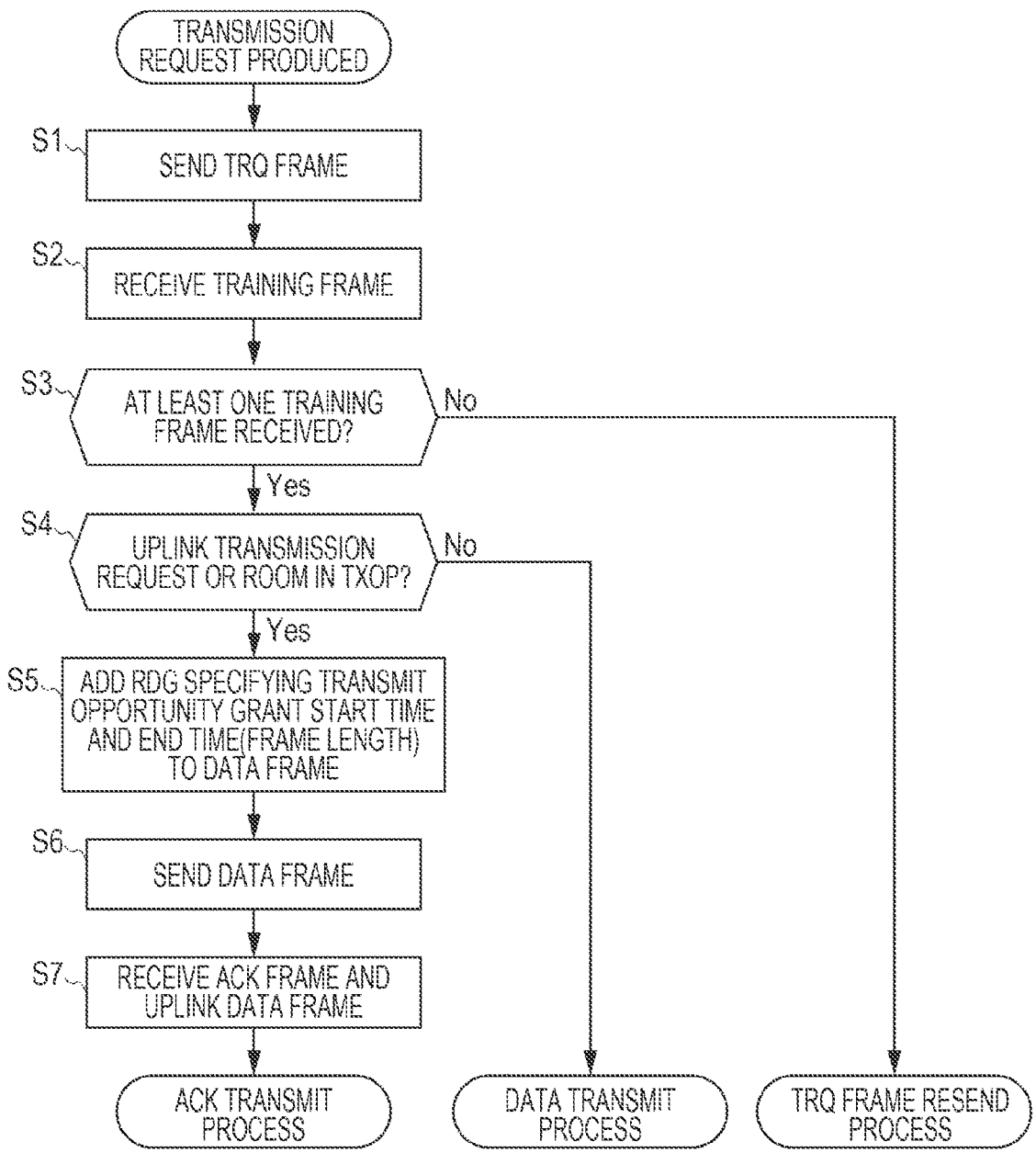
FIG. 8 is a flowchart illustrating a processing sequence wherein, given the communication sequences illustrated in FIGS. 5 to 7, the communication apparatus illustrated in FIG. 2 operates as an access point (STA0) and transmits multiplexed frames addressed to a plurality of stations at the same time.

FIG. 8 illustrates a processing sequence in flowchart form wherein, given the communication sequences illustrated in FIGS. 5 to 7, the communication apparatus illustrated in FIG. 2 operates as an access point (STA0) and transmits multiplexed frames addressed to a plurality of stations at the same time. As discussed above, in the communication sequences, an RD protocol is applied with the access point fulfilling the role of RD initiator.

The processing routine activates in response to a data transmission request being produced in an upper layer, or to an uplink data reception request being produced. The access point conducts physical carrier sensing in advance to determine that the medium is clear, and additionally conducts a backoff, etc. to acquire a TXOP. Then, the access point transmits a training request (TRQ) frame to one or more terminals (STA1 to STA3) to which the access point wants to transmit multiplexed data (or from which the access point wants to receive data by uplink) (step S1).

Then, once a given frame interval SIFS (Short Inter Frame Space) elapses after completely transmitting the TRQ frame, the access point stands by to receive training frames sent in reply from the respective training request recipients (STA1 to STA3) (step S2).

At this point, when the access point was not able to receive a training frame from any of the training request recipients (STA1 to STA3) (step S3, No), the process proceeds to a TRQ frame retransmit process. However, detailed description of a frame retransmit processing sequence is omitted.

In contrast, when the access point was able to receive a training frame from one or more of the training request recipients (STA1 to STA3) (step S3, Yes), the access point uses established sequences for learning that are respectively included in the received training frames to learn adaptive array antenna weights.

Subsequently, the access point checks whether or not there is an uplink data reception request with respect to a terminal from which a training frame could be received, or whether or not there is room in the TXOP (step S4).

At this point, when there is no uplink data reception request or when there is a data reception request but no room in the TXOP (step S4, No), the access point multiplexes and transmits frames without indicating an RDG after a given frame interval SIFS has elapsed since completely receiving the training frames. The overall processing routine ends.

At this point, by using the learned adaptive array antenna weights, the access point is able to apply space-division multiplexing to data frames addressed to a plurality of terminals and transmit them simultaneously. However, since learning was not conducted for terminals from which a training frame could not be received, and since it is unclear whether such terminals even exist within communicable range, it is configured such that the access point refrains from transmitting data frames thereto. Also, the access point may adjust the respective frames to be multiplexed and sent such that their frame lengths become uniform.

In contrast, when there is an uplink data reception request and also room in the TXOP (step S4, Yes), the access point includes an RDG field specifying transmit opportunity grant start time, transmit opportunity grant end time, and frame length in the data frames addressed to the respective terminals (step S5), and transmits them at the same time (step S6).

At this point, by using the learned adaptive array antenna weights, the access point is able to apply space-division multiplexing to data frames addressed to a plurality of terminals and transmit them simultaneously. Also, the access point may adjust the respective frames to be multiplexed and sent such that their frame lengths become uniform.

After that, the access point stands by to receive ACK frames and data frames simultaneously sent from the respective terminals (step S7). Then, once the data frames are received, the access point replies with ACK frames after a given frame interval SIFS has elapsed. The overall processing routine ends.

Figure 9:
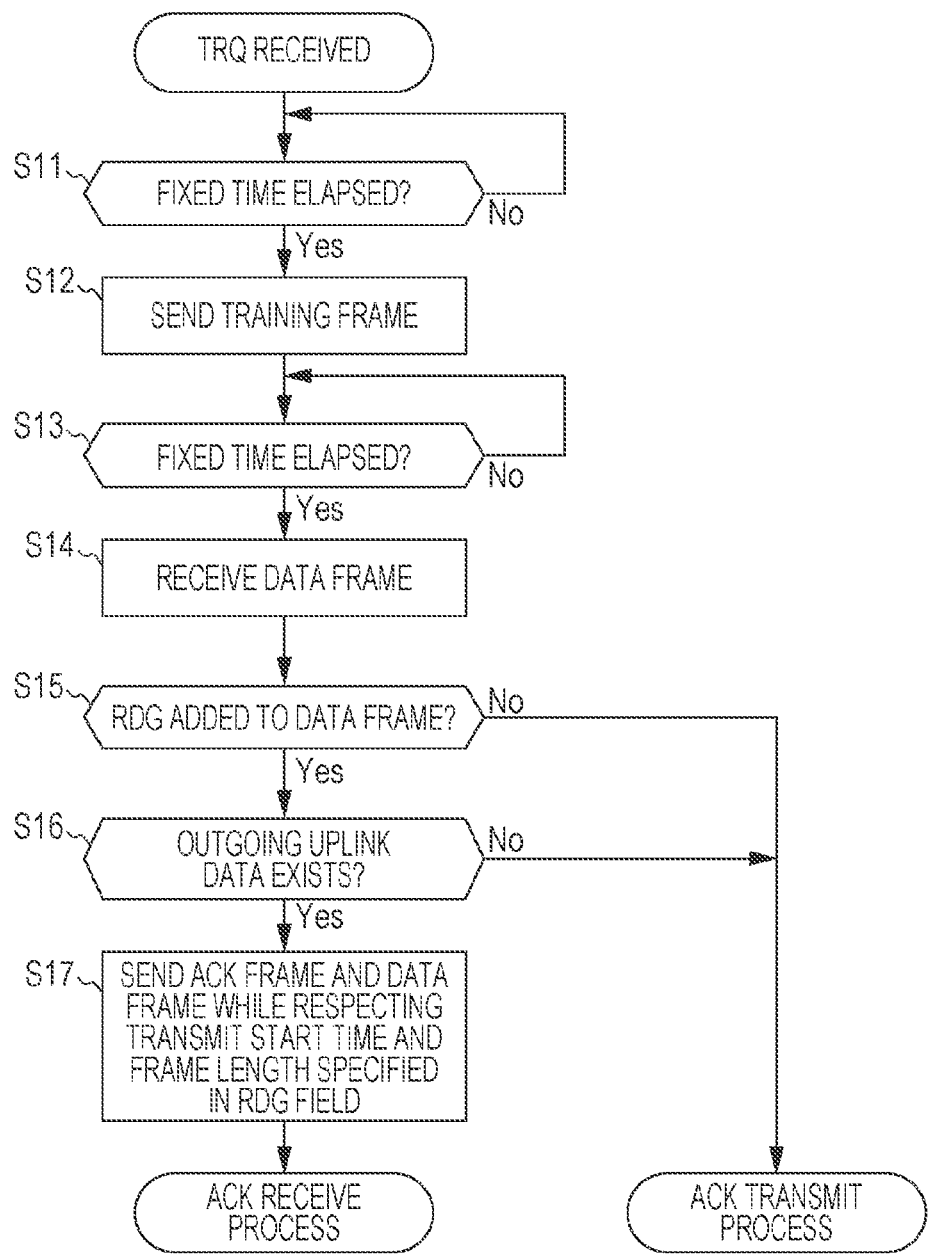
FIG. 9 is a flowchart illustrating a processing sequence wherein, given the communication sequences illustrated in FIGS. 5 to 7, the communication apparatus illustrated in FIG. 2 operates as one of the terminals (STA1 to STA3) and transmits multiplexed frames addressed to a plurality of stations at the same time.

FIG. 9 illustrates a processing sequence in flowchart format wherein, given the communication sequences illustrated in FIGS. 5 to 7, the communication apparatus illustrated in FIG. 2 operates as one of the terminals (STA1 to STA3) and transmits multiplexed frames addressed to a plurality of stations at the same time. As discussed earlier, in the communication sequence, an RD protocol is applied with the terminal fulfilling the role of RD responder.

After a given frame interval SIFS has elapsed since completely receiving a TRQ frame from an access point (step S11, Yes), the terminal replies to the access point with a training frame (step S12).

Then, once a given frame interval SIFS elapses after the training frame is completely sent (step S13, Yes), the terminal stands by to receive a data frame sent from the access point (step S14).

Upon receiving the downlink data frame from the access point, the terminal checks whether or not an RDG field indicating a transmit opportunity grant has been added (step S15).

In the case where an RDG field has not been added to the received data frame (step S15, No), the terminal replies to the access point with an ACK frame after a given frame interval SIFS has elapsed since completely receiving the data frame. The processing routine ends.

In the case where an RDG field has been added to the received data frame, the terminal additionally checks whether or not there exists transmit uplink data addressed to the access point which is the source of the data frame (step S16).

When transmit uplink data addressed to the access point does not exist (step S16, No), the terminal replies to the access point with an ACK frame after a given frame interval SIFS has elapsed since completely receiving the data frame. The processing routine ends.

In contrast, in the case where transmit uplink data addressed to the access point does exist (step S16, Yes), the terminal consecutively transmits an ACK frame and an uplink data frame to the access point after a given frame interval SIFS has elapsed since completely receiving the data frame. At this point, the terminal transmits the data frame while respecting the transmit start time and the frame length specified in the RDG field (step S17). The processing routine ends.

INDUSTRIAL APPLICABILITY

The foregoing has thus described the present invention in detail and with reference to specific embodiments. However, it is obvious that persons skilled in the art may make adjustments or substitutions to such embodiments within a scope that does not depart from the principal matter of the present invention.

In this specification, an embodiment applied to a new wireless LAN standard such as IEEE 802.11ac attempting to realize very high throughput of 1 Gbps was primarily described, but the principal matter of the present invention is not limited thereto. For example, the present invention may be similarly applied to other wireless LAN systems wherein wireless resources on a spatial axis are shared among a plurality of users, or to various wireless systems other than LAN.

In short, the present invention has been disclosed in the form of examples, and the stated content of this specification is not to be interpreted in a limiting manner. The principal matter of the present invention should be determined in conjunction with the Claims.

REFERENCE SIGNS LIST 20-1, 20-2, . . . transmit/receive signal branch
21-1, 21-2, . . . antenna element
22-1, 22-2, . . . duplexer
23-1, 23-2, . . . transmit signal processor
24-1, 24-2, . . . receive signal processor
25 data processor
30 transmit/receive signal branch
31 antenna element
32 duplexer
33 transmit signal processor
34 receive signal processor
35 data processor

The invention claimed is:

1. A communication device, comprising:
circuitry configured to:
generate a plurality of media access control (MAC) information fields that includes trigger information, wherein
the trigger information indicates that uplink frame transmission is permitted, and
the plurality of MAC information fields is addressed to respective communication devices of a plurality of communication devices;
transmit the plurality of MAC information fields at a downlink frame time to the plurality of communication devices; and
concurrently receive, at an uplink frame time Short Inter Frame Space (SIFS) after the downlink frame time, a plurality of response frames compliant with the trigger information sent from the respective communication devices of the plurality of communication devices, wherein
the plurality of response frames has same frame length,
the trigger information specifies the same frame length for the plurality of response frames, and
the plurality of response frames is within a duration specified by duration information for network allocation vector.

2. The communication device according to claim 1, wherein the circuitry is further configured to specify, by the trigger information, that the plurality of response frames is based on uplink multi-user Multi-Input Multi-Output (MU-MIMO).

3. The communication device according to claim 1, wherein each of the plurality of response frames is a data frame.

4. A communication device, comprising:
circuitry configured to:
receive a plurality of Media Access Control (MAC) information fields addressed to the communication device;
generate an uplink response frame based on the reception of the plurality of MAC information fields, wherein
the uplink response frame has a frame length specified by trigger information,
the plurality of MAC information fields includes the trigger information which indicates that uplink frame transmission is permitted, and
the plurality of MAC information fields is sent at a downlink frame time; and
concurrently transmit, with a plurality of communication devices that transmits respective uplink response frames, the uplink response frame at an uplink frame time Short Inter Frame Space (SIFS) after the downlink frame time, wherein
the respective uplink response frames transmitted from the plurality of communication devices have the frame length specified by the trigger information, and
the respective uplink response frames are within a duration specified by duration information for network allocation vector.

5. The communication device according to claim 4, wherein the circuitry is further configured to pad the uplink response frame such that the uplink response frame has the frame length specified by the trigger information.

6. The communication device according to claim 4, wherein
the trigger information indicates that uplink multi-user Multi-Input Multi-Output (MU-MIMO) is used for the uplink response frame, and
the circuitry is further configured to execute the uplink MU-MIMO for the uplink response frame based on the trigger information.

7. The communication device according to claim 4, wherein the uplink response frame is a data frame.

8. A communication method, comprising:
in a communication device:
generating a plurality of Media Access Control (MAC) information fields that includes trigger information, wherein
the trigger information indicates that uplink frame transmission is permitted, and
the plurality of MAC information fields is addressed to respective communication devices of a plurality of communication devices;
transmitting the plurality of MAC information fields at a downlink frame time to the plurality of communication devices; and
receiving, at an uplink frame time Short Inter Frame Space (SIFS) after the downlink frame time, a plurality of response frames compliant with the trigger information sent from the respective communication devices of the plurality of communication devices, wherein
the plurality of response frames has same frame length,
the trigger information specifies the same frame length for the plurality of response frames, and
the plurality of response frames is within a duration specified by duration information for network allocation vector.

9. The communication method according to claim 8, further comprising specifying, by the trigger information, that the plurality of response frames is based on uplink multi-user Multi-Input Multi-Output (MU-MIMO).

10. The communication method according to claim 8, wherein each of the plurality of response frames is a data frame.

11. A communication method, comprising:
in a communication device:
receiving a plurality of Media Access Control (MAC) information fields addressed to the communication device;
generating an uplink response frame that has a frame length specified by trigger information, wherein
the generation of the uplink response frame is based on a reception of the plurality of MAC information fields addressed to the communication device
the plurality of MAC information fields includes the trigger information which indicates that uplink frame transmission is permitted, and
the plurality of MAC information fields is sent at a downlink frame time; and
transmitting, concurrently with a plurality of communication devices that transmits respective uplink response frames, the uplink response frame at an uplink frame time Short Inter Frame Space (SIFS) after the downlink frame time, wherein
the respective uplink response frames transmitted from the plurality of communication devices have the frame length specified by the trigger information, and
the respective uplink response frames are within a duration specified by duration information for network allocation vector.

12. The communication method according to claim 11, further comprising padding the uplink response frame such that the uplink response frame has the frame length specified by the trigger information.

13. The communication method according to claim 11, further comprising executing uplink multi-user Multi-Input Multi-Output (MU-MIMO) for the uplink response frame based on the trigger information,
wherein the trigger information indicates that the uplink MU-MIMO is used for the uplink response frame.

14. The communication method according to claim 11, wherein the uplink response frame is a data frame.

* * * * *